United States Patent
Tomita et al.

(10) Patent No.: US 10,054,884 B2
(45) Date of Patent: Aug. 21, 2018

(54) DRIVE TRANSMISSION MECHANISM HAVING A HIGH REDUCTION RATIO FOR USE IN A FIXING DEVICE

(71) Applicants: Kenji Tomita, Tokyo (JP); Kimihiro Tanaka, Kanagawa (JP); Yohei Miura, Tokyo (JP)

(72) Inventors: Kenji Tomita, Tokyo (JP); Kimihiro Tanaka, Kanagawa (JP); Yohei Miura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/603,927

(22) Filed: May 24, 2017

(65) Prior Publication Data

US 2017/0343937 A1 Nov. 30, 2017

(30) Foreign Application Priority Data

May 30, 2016 (JP) ................. 2016-107966

(51) Int. Cl.
*G03G 15/20* (2006.01)
*F16H 1/00* (2006.01)
(Continued)

(52) U.S. Cl.
CPC ....... *G03G 15/2067* (2013.01); *F16H 37/041* (2013.01); *G03G 15/2032* (2013.01); *F16H 1/16* (2013.01); *F16H 1/28* (2013.01)

(58) Field of Classification Search
CPC .......... G03G 15/2067; G03G 15/2071; G03G 15/2032; G03G 15/2035; F16H 1/16;
(Continued)

(56) References Cited

U.S. PATENT DOCUMENTS 3,888,138 A * 6/1975 Hiersig .................. B21B 35/12
475/332
5,585,598 A * 12/1996 Kasahara ........... G03G 15/0126
106/8
(Continued)

FOREIGN PATENT DOCUMENTS

JP 61-232703 10/1986
JP 06095552 A * 4/1994 ............. G03G 13/20
(Continued)

*Primary Examiner* — Robert Beatty
(74) *Attorney, Agent, or Firm* — Harness, Dickey & Pierce P.L.C.

(57) ABSTRACT

A fixing device, which is included in an image forming apparatus, includes a heater, a heating target body, a biasing body, a pressure body, a moving body, a drive source, and a drive transmitter. The heating target body is configured to be heated by the heater. The biasing body is configured to apply a biasing force. The pressure body is configured to be pressed by the biasing body toward the heating target body. The moving body is configured to move the pressure body away from the heating target body against the biasing force applied by the biasing body. The drive source is configured to apply a driving force. The drive transmitter is configured to transmit the driving force of the drive source to the moving body and includes a planetary gear device and a worm gear.

11 Claims, 6 Drawing Sheets

(51) Int. Cl.
*F16H 37/04* (2006.01)
*F16H 1/16* (2006.01)
*F16H 1/28* (2006.01)

(58) Field of Classification Search
CPC . F16H 1/28; F16H 37/041; B30B 3/00; B30B 3/04; B30B 15/34
USPC .......... 399/328, 331; 100/172, 176; 219/216
See application file for complete search history.

(56) References Cited

U.S. PATENT DOCUMENTS

| | | |
|---|---|---|
| 2009/0017953 A1 | 1/2009 | Uehara et al. |
| 2015/0003871 A1* | 1/2015 | Takahashi ......... G03G 15/2064 399/122 |
| 2016/0062300 A1 | 3/2016 | Takagi et al. |
| 2016/0378049 A1 | 12/2016 | Tomita et al. |

FOREIGN PATENT DOCUMENTS

| | | | |
|---|---|---|---|
| JP | 7-224417 | | 8/1995 |
| JP | 11077199 A | * | 3/1999 |
| JP | 2000118747 A | * | 4/2000 |
| JP | 2001-153188 | | 6/2001 |
| JP | 2001-286096 | | 10/2001 |
| JP | 2007-070883 | | 3/2007 |
| JP | 2007-112397 | | 5/2007 |
| JP | 2009-037198 | | 2/2009 |
| JP | 2011-154325 | | 8/2011 |
| JP | 2013054245 A | * | 3/2013 |
| JP | 2013-064932 | | 4/2013 |
| JP | 2016143016 A | * | 8/2016 |

\* cited by examiner

DRIVE TRANSMISSION MECHANISM HAVING A HIGH REDUCTION RATIO FOR USE IN A FIXING DEVICE

CROSS-REFERENCE TO RELATED APPLICATION

This patent application is based on and claims priority pursuant to 35 U.S.C. § 119(a) to Japanese Patent Application No. 2016-107966, filed on May. 30, 2016, in the Japan Patent Office, the entire disclosure of which is hereby incorporated by reference herein.

BACKGROUND

Technical Field

This disclosure relates to a fixing device and an image forming apparatus incorporating the fixing device.

Related Art

A various types of image forming apparatuses, which employ an electrophotography technique, such as a copier, facsimile machine, and printer, include a fixing device to fix a toner image formed on a recording medium such as a paper sheet to the recording medium. Such a fixing device includes, for example, a fixing roller and a pressure roller. The fixing roller functions as a heating target member to be heated by a heater. The pressure roller functions as a pressing member to be pressed to the fixing roller by a biasing member such as a pressure spring. The fixing roller and the pressure roller form a fixing nip region.

For example, a known fixing device includes a cam, a motor, and a drive transmission mechanism. The cam functions as a moving member to move the pressure roller in a direction to separate from the fixing roller against a biasing force applied by the biasing member. The motor functions as a drive source. The drive transmission mechanism transmits a driving force of the motor to the cam. For example, after completion of image formation, the motor is driven to cause the cam to move the pressure roller from the fixing roller against the biasing force of the biasing member. Therefore, the pressure roller is separated from the fixing roller.

When the pressure roller is moved in the direction to be separated from the fixing roller against the biasing force of the biasing member, a large load torque is applied to the cam. Therefore, in order to drive and rotate the cam, it is expected that the motor has a large drive torque. A motor having a large drive torque is large in size and expensive, which is likely to cause an increase in size and cost of the fixing device and the image forming apparatus incorporating the fixing device.

SUMMARY

At least one aspect of this disclosure provides a fixing device including a heater, a heating target body, a biasing body, a pressure body, a moving body, a drive source, and a drive transmitter. The heating target body is configured to be heated by the heater. The biasing body is configured to apply a biasing force. The pressure body is configured to be pressed by the biasing body toward the heating target body. The moving body is configured to move the pressure body away from the heating target body against the biasing force applied by the biasing body. The drive source is configured to apply a driving force. The drive transmitter is configured to transmit the driving force of the drive source to the moving body and includes a planetary gear device and a worm gear.

Further, at least one aspect of this disclosure provides an image forming apparatus including an image bearer, a toner image forming device, a transfer device, and a fixing device. The image bearer is configured to bear an image on a surface thereof. The toner image forming device is configured to form a toner image on the surface of the image bearer. The transfer device is configured to transfer the image from the image bearer onto a recording medium. The fixing device is the above-described fixing device configured to fixed the toner image transferred onto the recording medium to the recording medium.

DETAILED DESCRIPTION

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

A description is given of a configuration and functions of an image forming apparatus according to an embodiment of this disclosure, with reference to drawings.

It is to be noted that identical parts are given identical reference numerals and redundant descriptions are summarized or omitted accordingly.

Now, a description is given of an electrophotographic image forming apparatus 100 for forming images by electrophotography.

Figure 1:
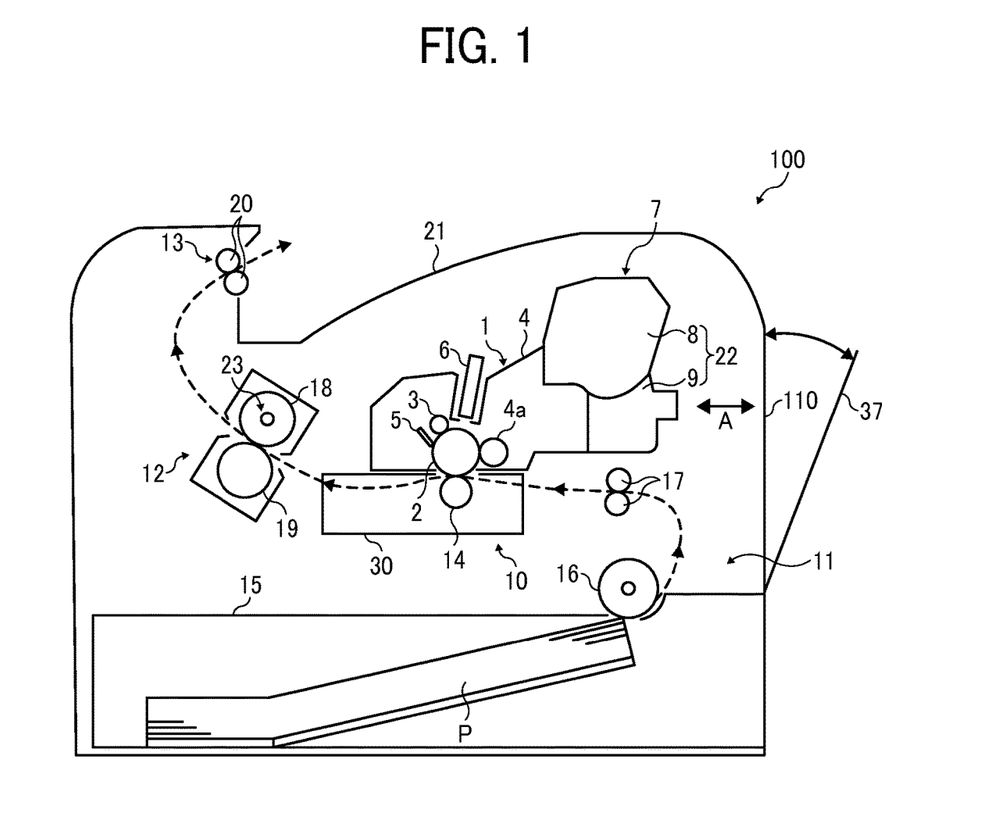
FIG. 1 is a schematic diagram illustrating an image forming apparatus according to an embodiment of this disclosure.

FIG. 1 is a schematic diagram illustrating the image forming apparatus 100 according to an embodiment of this disclosure.

It is to be noted that identical parts are given identical reference numerals and redundant descriptions are summarized or omitted accordingly.

The image forming apparatus 100 may be a copier, a facsimile machine, a printer, a multifunction peripheral or a multifunction printer (MFP) having at least one of copying, printing, scanning, facsimile, and plotter functions, or the like. According to the present example, the image forming apparatus 100 is an electrophotographic printer that forms toner images on recording media by electrophotography.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet conveying passage to a downstream side thereof; the term "width direction" indicates a direction basically perpendicular to the sheet conveying direction.

The image forming apparatus 100 according to the present embodiment of this disclosure, illustrated in FIG. 1, is a monochrome printer. The image forming apparatus 100 includes an apparatus body 110 and a process cartridge 1 that is disposed detachably attached to the apparatus body 110. The process cartridge 1 that is detached and attached in a direction indicated by arrow A in FIG. 1 and includes a photoconductor 2, a charging roller 3, a developing device 4, and a cleaning blade 5. The photoconductor 2 functions as an image bearer to bear an image on a surface thereof. The charging roller 3 functions as a charging device to uniformly charge the surface of the photoconductor 2. The developing device 4 develops the image formed on the surface of the photoconductor 2 into a visible image. The cleaning blade 5 functions as a cleaning device to clean the surface of the photoconductor 2. The image forming apparatus 100 further includes an LED (light emitting diode) head array 6 disposed near the photoconductor 2. The LED head array 6 functions as an exposing device to expose the surface of the photoconductor 2.

The process cartridge 1 includes a toner cartridge 7 that functions as a developer container. The toner cartridge 7 is detachably attached to the process cartridge 1. The toner cartridge 7 includes a container body 22 in which a developer storing section 8 and a developer collecting section 9 are provided as a single unit. The developer storing section 8 accommodates toner that functions as developer to be supplied to the developing device 4. The developer collecting section 9 collects toner (used toner) that has been removed by the cleaning blade 5.

The image forming apparatus 100 further includes a transfer device 10, a sheet feeding device 11, a fixing device 12, and a sheet discharging device 13. The transfer device 10 transfers the image formed on the surface of the photoconductor 2 onto a sheet P such as a transfer medium. The sheet feeding device 11 supplies the sheet P toward the transfer device 10. The fixing device 12 fixes the image transferred onto the sheet P to the sheet P. The sheet discharging device 13 outputs the sheet P outside the apparatus body 110 of the image forming apparatus 100.

The transfer device 10 includes a transfer roller 14. The transfer roller 14 functions as a transfer body rotatably disposed to a transfer frame 30. The transfer roller 14 is in contact with the photoconductor 2 in a state in a state in which the process cartridge 1 is attached to the apparatus body 110 of the image forming apparatus 100. A transfer nip region is formed at a contact portion at which the photoconductor 2 and the transfer roller 14 contact to each other. In addition, the transfer roller 14 is connected to a power source, and a predetermined direct current (DC) voltage and/or an alternating current (AC) voltage are supplied to the transfer roller 14.

The sheet feeding device 11 includes a sheet feed tray 15 and a sheet feed roller 16. The sheet feed tray 15 accommodates the sheet P. The sheet feed roller 16 feeds the sheet P accommodated in the sheet feed tray 15. Further, a pair of registration rollers 17 is disposed downstream from the sheet feed roller 16 in a sheet conveying direction. The pair of registration rollers 17 functions as a pair of timing rollers to convey the sheet P to a transfer nip region at a proper timing of conveyance of the sheet P.

It is to be noted that the sheet P is not limited to the above-described transfer medium but also includes thick paper, post card, envelope, plain paper, thin paper, coated paper, art paper, tracing paper, and the like. The sheet P further includes a non-paper material such as OHP sheet, OHP film, and any other sheet-shaped material on which an image can be formed.

The fixing device 12 includes a fixing roller 18 and a pressure roller 19. The fixing roller 18 is heated by an infrared heater 23 that is disposed inside the fixing roller 18. The pressure roller 19 has a roller shaft 19a and is pressed toward the fixing roller 18 to contact the fixing roller 18. A fixing nip region is formed at a position where the fixing roller 18 and the pressure roller 19 contact with each other.

The sheet discharging device 13 includes a pair of sheet ejecting rollers 20. After having been ejected to the outside of the apparatus body 110 of the image forming apparatus 100 by the pair of sheet ejecting rollers 20, the sheet P is loaded on a sheet output tray 21 that has a concaved shape on an upper face of the apparatus body 110 of the image forming apparatus 100.

Next, a description is given of basic functions of the image forming apparatus 100 according to the present embodiment of this disclosure, with reference to FIG. 1. When an imaging operation is started, the photoconductor 2 of the process cartridge 1 is rotated in a clockwise direction in FIG. 1, and the charging roller 3 uniformly charges the surface of the photoconductor 2 with a predetermined polarity. The LED head array 6 emits a light beam onto the charged face of the photoconductor 2 based on image data input from an external device, so that an electrostatic latent image is formed on the surface of the photoconductor 2.

The developing device 4 includes a developing roller 4a by which toner is supplied onto the electrostatic latent image formed on the photoconductor 2, thereby developing (visualizing) the electrostatic latent image into a visible image as a toner image.

Further, as the imaging operation is started, the transfer roller 14 is rotated and a predetermined direct current (DC) and/or the alternating current (AC) are supplied to the transfer roller 14. As a result, a transfer electric field is formed at a primary transfer nip region formed between the transfer roller 14 and the opposing photoconductor 2.

By contrast, the sheet feed roller 16 that is disposed in a lower portion of the apparatus body 110 of the image forming apparatus 100 is driven and rotated to feed the sheet P from the sheet feed tray 15. Conveyance of the sheet P fed from the sheet feed tray 15 is interrupted by the pair of registration rollers 17 temporarily.

Thereafter, at the predetermined timing, the pair of registration rollers 17 starts rotating again. Then, in synchronization with movement of the toner image formed on the surface of the photoconductor 2 reaching the transfer nip region, the sheet P is conveyed to the transfer nip region. By forming the transfer electric field, the toner image formed on the surface of the photoconductor 2 is collectively transferred onto the sheet P. After the transfer of the toner image from the photoconductor 2 onto the sheet P, the cleaning blade 5 removes residual toner, which is failed to be transferred onto the sheet P and therefore remains on the surface of the photoconductor 2, from the surface of the photoconductor 2. The removed toner is conveyed and collected into the developer collecting section 9 of the container body 22.

Thereafter, the sheet P having the toner image thereon is conveyed to the fixing device 12, where the toner image is fixed to the sheet P. Then, the sheet P is ejected by the pair of sheet ejecting rollers 20 to the outside of the apparatus body 110 of the image forming apparatus 100 and stocked onto the sheet output tray 21.

The image forming apparatus 100 further includes a cover 37 on a side face of the apparatus body 110. The cover 37 opens and closes in a direction indicated by arrow in FIG. 1. By opening the cover 37, the process cartridge 1 can be removed from the apparatus body 110 of the image forming apparatus 100.

Figure 2:
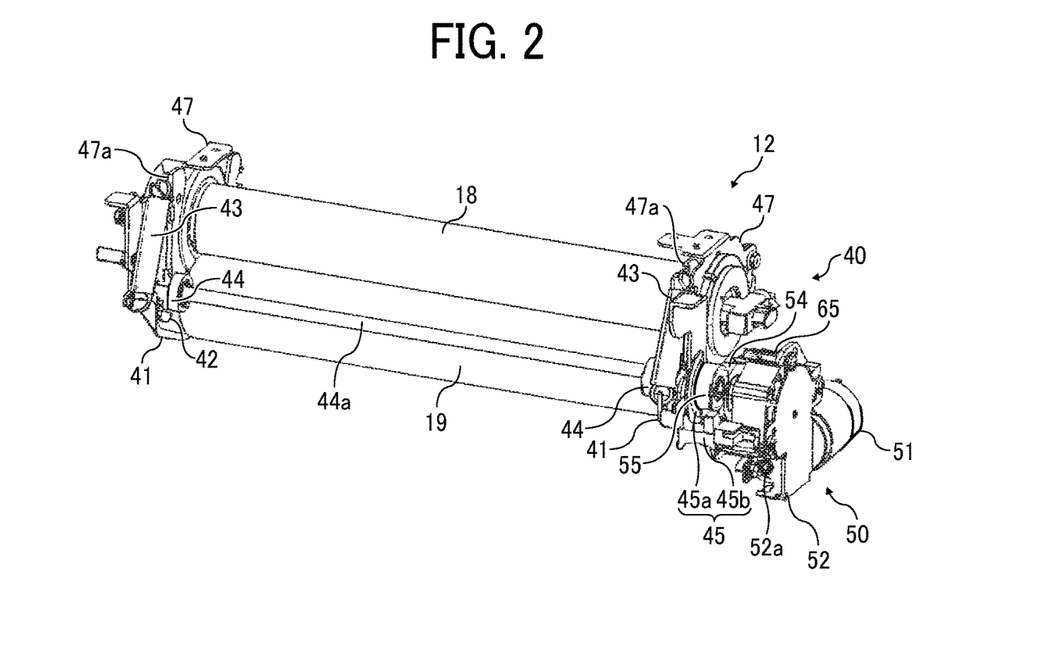
FIG. 2 is a perspective view illustrating a fixing device included in the image forming apparatus of FIG. 1.
Figure 3:
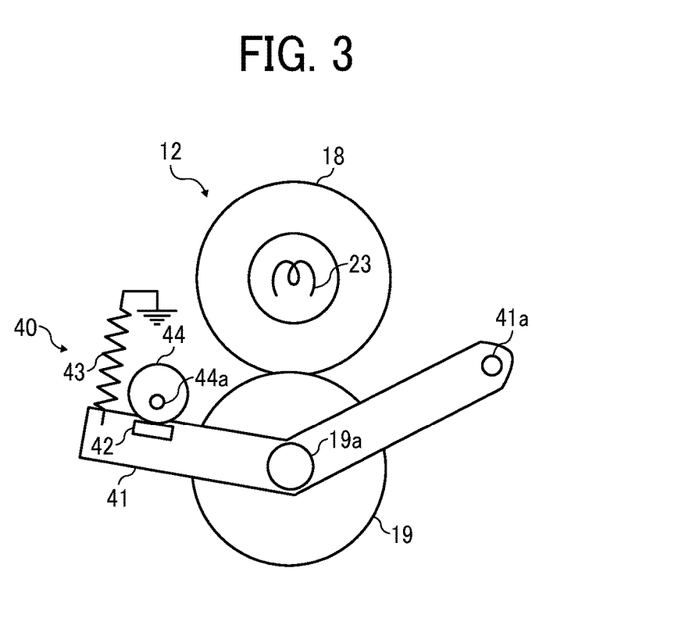
FIG. 3 is a schematic cross sectional view illustrating the fixing device.

FIG. 2 is a perspective view illustrating the fixing device 12 included in the image forming apparatus 100. FIG. 3 is a schematic cross sectional view illustrating the fixing device 12.

The fixing device 12 includes the fixing roller 18, the pressure roller 19, and a pressure adjustment mechanism 40. The fixing roller 18 functions as a heater facing body and includes the infrared heater 23 therein, so that the infrared heater 23 heats the fixing roller 18. The pressure roller 19 functions as a pressure body to be pressed against the fixing roller 18 and form a fixing nip region with the fixing roller 18. The pressure adjustment mechanism 40 adjusts a pressing force applied to the pressure roller 19 against the fixing roller 18. The pressure adjustment mechanism 40 includes a pair of levers 41, a pair of springs 43, a pair of cams 44, and a drive device 50. The pair of levers 41 supports the pressure roller 19 to approach and separate relative to the fixing roller 18. The pair of springs 43 functions as a biasing body to bias the pressure roller 19 toward the fixing roller 18 via the pair of levers 41. The pair of cams 44 functions as a moving body to move the pressure roller 19 from the fixing roller 18 against a biasing force applied by the pair of springs 43 via the pair of levers 41. The drive device 50 drives the pair of cams 44.

The fixing roller 18 is rotatably supported by a pair of side plates 47 on both sides in an axial direction. The pressure roller 19 is rotatably supported by the pair of levers 41 of the pressure adjustment mechanism 40 on both sides in the axial direction. As illustrated in FIG. 3, one end of each of the pair of levers 41 is supported by a support shaft 41a that is mounted on the pair of side plates 47. One end of each of the pair of springs 43 that functions as a biasing body is attached to the opposed end of each of the pair of levers 41. As illustrated in FIG. 2, the opposed end of each of the pair of springs 43 is attached to a bearing 47a mounted on each of the pair of side plates 47. A cam bearing 42 is provided on the opposed end of each of the pair of levers 41. Each of the pair of cams 44 is in contact with the cam bearing 42.

The pair of cams 44 is mounted on a cam shaft 44a so that the pair of cams 44 rotates together with the cam shaft 44a as a single unit. The fixing device 12 further includes a cam gear 55. The cam gear 55 is disposed at a far end (a right side end in FIG. 2) of the cam shaft 44a and mounted on the cam shaft 44a, so that the cam gear 55 that meshes with a second output gear 54 of the drive device 50 rotates together with the cam shaft 44a as a single unit.

The fixing device 12 further includes a rotation angle detection mechanism 45 to detect an angle of rotation of the pair of cams 44. A feeler 45a of the rotation angle detection mechanism 45 is disposed at the far end of the cam shaft 44a. The feeler 45a is mounted on the cam shaft 44a, so that the feeler 45a rotates together with the cam shaft 44a as a single unit. The rotation angle detection mechanism 45 further includes an optical sensor 45b that is disposed on a far side plate of the pair of side plates 47 to detect the feeler 45a. The feeler 45a is a semicircle shape. The optical sensor 45b is a photointerrupter (a transmission optical sensor).

In the process of rotation of the cam shaft 44a, as the cam shaft 44a reaches a predetermined position of angle of rotation, the feeler 45a is moved to a gap formed between a light emitting element and a light receiving element of the optical sensor 45b to block or shield an optical path formed therebetween. As the cam shaft 44a rotates by 180 degrees from the above-described state, the feeler 45a is removed from the gap between the light emitting element and the light receiving element of the optical sensor 45b. Accordingly, the light receiving element of the optical sensor 45b receives light emitted by the light emitting element. Upon receipt of light from the light emitting element, the light receiving element of the optical sensor 45b sends a light receiving signal to a controller. The controller grasps the position of angle of rotation of a projecting portion of the pair of cams 44 that is fixed to the cam shaft 44a based on a timing at which the light receiving signal from the light receiving element is lost and an amount of driving force of a drive motor 51 from the timing.

In the present embodiment, in a case in which a paper jam occurs in the fixing device 12, the pressure adjustment mechanism 40 separates the pressure roller 19 from the fixing roller 18, so as to release the fixing roller 18 from the pressure applied by the pressure roller 19. Specifically, the drive motor 51 of the drive device 50 is driven to rotate the pair of cams 44. Consequently, the pair of cams 44 in the state as illustrated in FIG. 3 presses the cam bearing 42 downwardly in FIG. 3, against the biasing force applied by the pair of springs 43. According to this action, the pair of levers 41 rotates about the support shaft 41a in a counterclockwise direction in FIG. 3. Then, the pressure roller 19 that is rotatably supported by the pair of levers 41 moves away from the fixing roller 18. By so doing, the pressure roller 19 is separated from the fixing roller 18. Consequently, a sheet or sheets jammed in the fixing nip region can be removed from the fixing nip region easily.

Further, in a case in which the image forming apparatus 100 is changed from a standby state to a sleep mode or in a case in which the power source is turned off, the pressure adjustment mechanism 40 reduces a pressing force of the pressure roller 19 to the fixing roller 18, thereby preventing occurrence of creep (deformation) at the fixing nip region. Further, in a case in which a thick paper such as an envelope is conveyed, the pressure adjustment mechanism 40 reduces the pressing force of the pressure roller 19 to the fixing roller 18. By so doing, a fixing operation can be performed without causing creases in the thick paper.

As described above, when reducing the pressing force of the pressure roller 19 to the fixing roller 18, the pair of cams 44 presses the pair of levers 41 downwardly against the biasing force of the pair of springs 43. As a result, a load torque of the pair of cams 44 increases. Further, the opposed end of the pair of levers 41 is pressed downwardly in FIG. 3. As a result, the pair of springs 43 extends, and therefore the biasing force of the pair of springs 43 increases. Consequently, the load torque of the pair of cams 44 increases. Accordingly, as the pressing force of the pressure roller 19 to the fixing roller 18 decreases, the load torque of the pair of cams 44 increases.

Now, a description is given of a comparative fixing device having a drive transmission mechanism that transmits a driving force applied by the drive motor 51 of the drive device 50 to the pair of cams 44.

When the drive transmission mechanism of the comparative fixing device includes a gear train that transmits the driving force by meshing of multiple external gears, a sufficient reduction ratio cannot be obtained. Therefore, a motor having a large drive torque is employed as the drive motor 51 that functions as a drive source, so that an output torque to be output to the pair of cams 44 becomes greater than the load torque of the pair of cams 44. Consequently, the pair of levers 41 can be rotated against the biasing force of the pair of springs 43. However, such a motor having a large drive torque is large in size and expensive. As a result, the size and cost of the image forming apparatus 100 including the comparative fixing device provided with the drive transmission mechanism increase.

In order to address this inconvenience, a different comparative fixing device includes a drive motor that rotates the fixing roller 18 to also function as a drive motor to drive the pair of cams 44. Specifically, a one-way clutch is provided to a drive transmission passage through which the driving force of the drive motor is transmitted to the fixing roller and another one-way clutch is provided to a drive transmission passage through which the driving force of the drive motor is transmitted to the pair of cams 44. These one-way clutches are different from each other in rotatable directions of rotation. When rotating the fixing roller, the one-way clutch provided to the drive transmission passage through which the driving force of the drive motor is transmitted to the pair of cams idles, so that the pair of cams does not rotate. By contrast, when adjusting the pressing force of the pressure roller, the drive motor is rotated in reverse to a direction to drive the fixing roller. Accordingly, the one-way clutch provided to the drive transmission passage through which the driving force of the drive motor is transmitted to the fixing roller idles, and therefore the fixing roller is not rotated. By contrast, the driving force is transmitted to the pair of cams, and therefore the pair of cams rotates, so that the pressing force of the pressure roller is adjusted.

Since the pressure roller 19 is pressed to contact the fixing roller 18, the load torque of the fixing roller 18 is large. Therefore, as a drive motor to drive the fixing roller 18, a motor having a larger drive torque is employed. Consequently, even when the drive motor to drive the fixing roller 18 is used, the output torque to be output to the pair of cams 44 can be greater than the load torque. Accordingly, when compared with a configuration in which a drive motor to drive the pair of cams 44 and a different drive motor to drive the fixing roller are provided, the above-described configuration can reduce the size and cost of the fixing device and the image forming apparatus.

However, in the above-described comparative fixing device, when the image forming apparatus is booted due to, for example, recovery from the sleep mode, the drive motor is first rotated in reverse to press the pressure roller against the fixing roller by a predetermined pressing force. Then, the drive motor is rotated in a normal direction, and the fixing roller is rotated to increase the temperature of the fixing roller to a predetermined temperature. Accordingly, the above-described comparative fixing device takes long time to start up the image forming apparatus.

In order to address this inconvenience, the fixing device 12 according to the present embodiment includes a drive transmission mechanism to transmit the driving force to the pair of cams 44 includes a worm gear and a planetary gear mechanism so as to obtain a high reduction ratio using the worm gear and the planetary gear mechanism.

Now, a detailed description is given of the drive device 50 of the pressure adjustment mechanism 40 according to the present embodiment of this disclosure, with reference to FIGS. 4, 5, 6A, 6B, and 6C.

Figure 4:
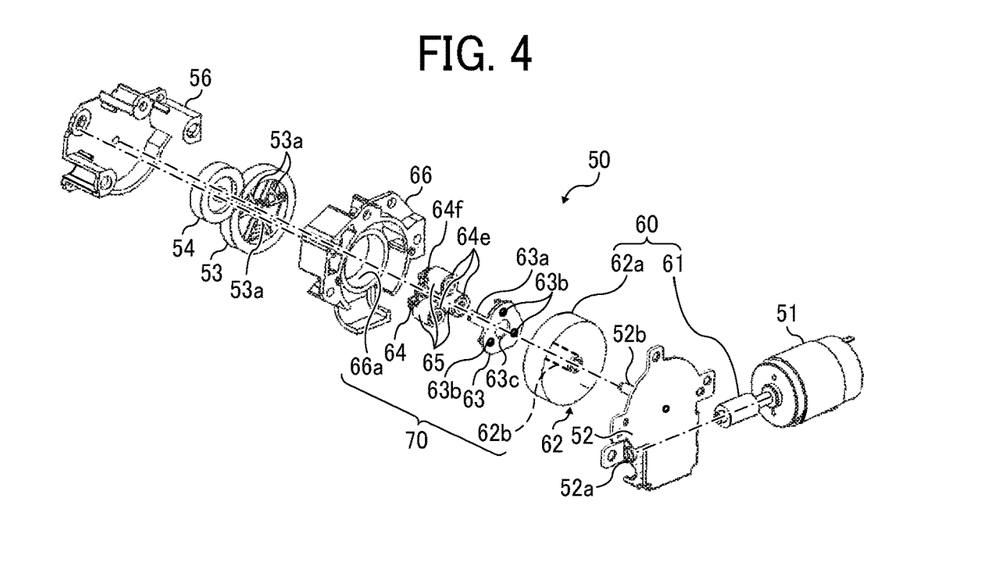
FIG. 4 is an exploded perspective view illustrating a drive device included in a pressure adjustment mechanism.
Figure 5:
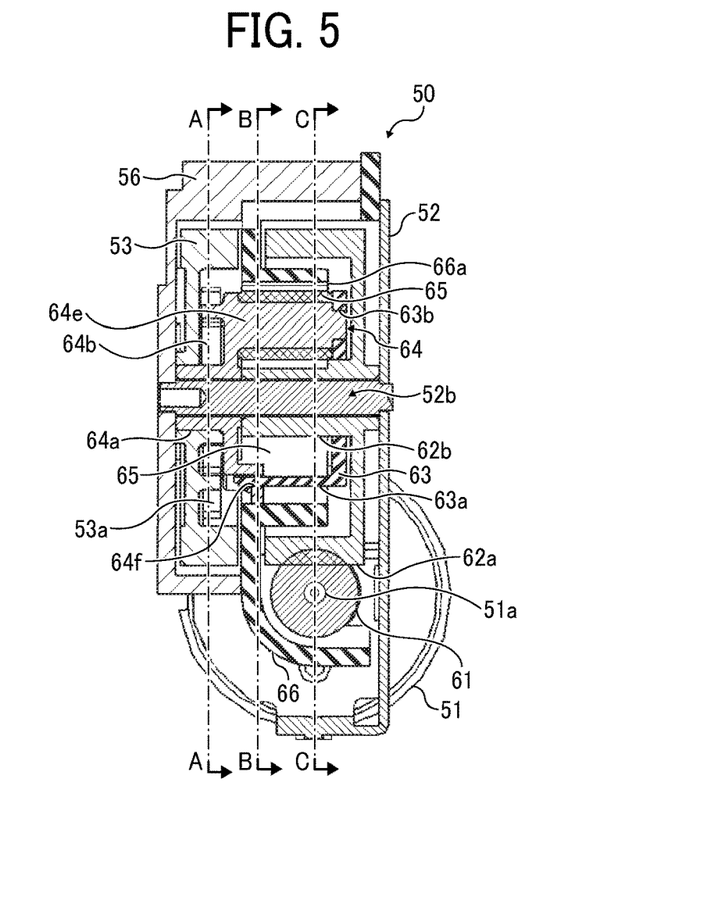
FIG. 5 is a cross sectional view illustrating the drive device, viewed parallel to an axial direction.
Figure 6A:
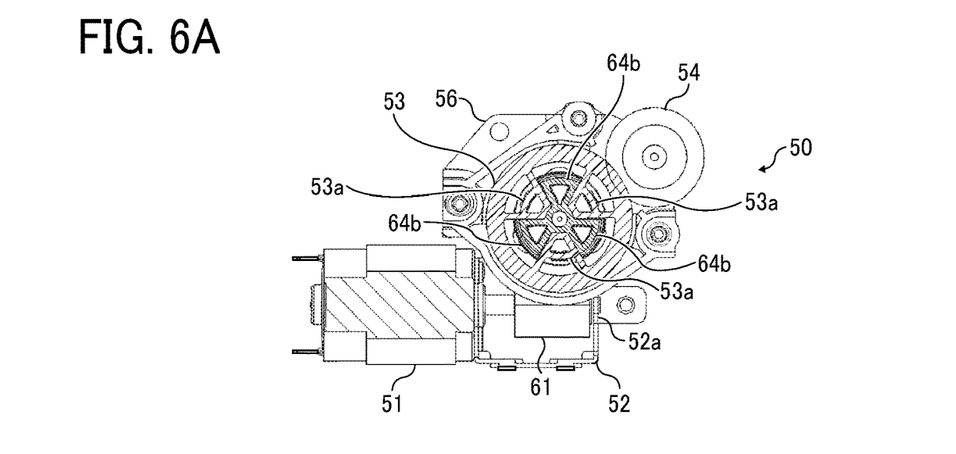
FIG. 6A is a cross sectional view of the drive device of FIG. 5, along a line A-A.
Figure 6B:
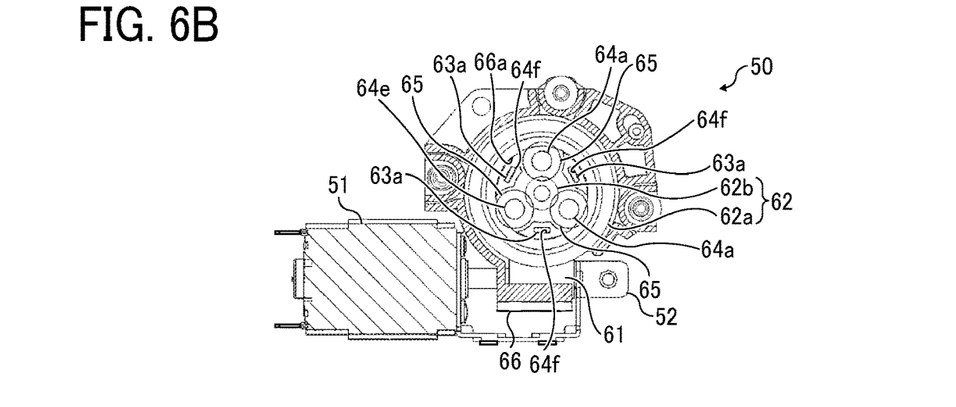
FIG. 6B is a cross sectional view of the drive device of FIG. 5, along a line B-B.
Figure 6C:
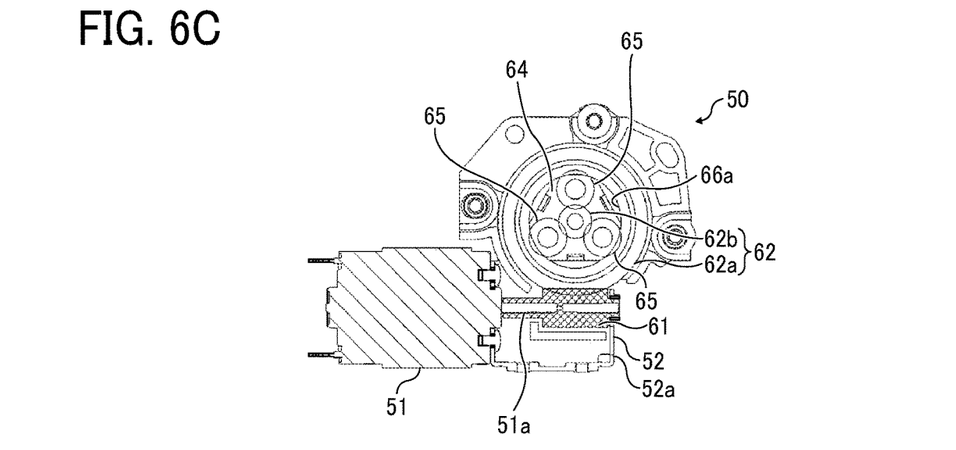
FIG. 6C is a cross sectional view of the drive device of FIG. 5, along a line C-C.

FIG. 4 is an exploded perspective view illustrating the drive device 50 included in the pressure adjustment mechanism 40. FIG. 5 is a cross sectional view illustrating the drive device 50, viewed parallel to an axial direction. FIG. 6A is a cross sectional view of the drive device 50 of FIG. 5, along a line A-A. FIG. 6B is a cross sectional view of the drive device 50 of FIG. 5, along a line B-B. FIG. 6C is a cross sectional view of the drive device 50 of FIG. 5, along a line C-C.

As illustrated in FIG. 4, the drive device 50 includes a worm gear 60, a planetary gear mechanism 70, a first output gear 53, and the second output gear 54. A driving force exerted by the planetary gear mechanism 70 is transmitted to the first output gear 53. The second output gear 54 meshes with the first output gear 53. The drive device 50 further includes a bracket 52, a first housing 66, and a second housing 56. The bracket 52 covers the worm gear 60 and the planetary gear mechanism 70.

In the present embodiment, the drive motor 51 is a brush motor that is less expensive and more compact than a brushless motor. A worm 61 of the worm gear 60 is coaxially mounted on a motor shaft 51a that functions as a driving force output shaft of the drive motor 51, as illustrated in FIG. 6C, so as to rotate together with the motor shaft 51a as a single unit. The worm 61 is meshed with a helical teeth portion 62a of a worm wheel 62.

The worm wheel 62 has a cylindrical shape with one axial end on the motor side being blocked. The helical teeth portion 62a is formed on an outer circumference of the worm wheel 62. A sun gear 62b of the planetary gear mechanism 70 is formed inside the cylindrical shape of the worm wheel 62. The worm wheel 62 is rotatably supported by a support shaft 52b that is secured to the bracket 52 by caulking.

The planetary gear mechanism 70 is disposed inside the worm wheel 62. The planetary gear mechanism 70 includes the sun gear 62b, three planetary gears 65, a carrier 64, an internal gear 66a, and a carrier holder 63. The three planetary gears 65 mesh with the sun gear 62b. The carrier 64 rotatably supports the three planetary gears 65. The internal gear 66a meshes with the three planetary gears 65. The carrier holder 63 holds the planetary gears 65 to the carrier 64. The sun gear 62b and the internal gear 66a are mounted coaxially.

The planetary gears 65 are rotatably supported by respective planetary gear support shafts 64e mounted on the carrier 64 at equal intervals in a rotational direction. The carrier holder 63 includes snap fits 63a, shaft insertion holes 63b, and a through hole 63c. The leading edges of the respective planetary gear support shafts 64e are inserted into the shaft insertion holes 63b. The snap fits 63a are used to fit the carrier holder 63 to the carrier 64. The sun gear 62b passes through the through hole 63c. The inner diameter of the through hole 63c is sufficiently greater than the outer diameter of the sun gear 62b. The leading edges of the respective planetary gear support shafts 64e are inserted into the shaft insertion holes 63b of the carrier holder 63. While elastically deforming the snap fits 63a, claws at the leading edges of the snap fits 63a are inserted to pass through engaging holes 64f of the carrier 64. By so doing, the carrier holder 63 is attached to the carrier 64. Accordingly, the planetary gears 65 are held by the carrier 64.

The internal gear 66a is mounted on the first housing 66. The first housing 66 is combined with the bracket 52, thereby covering the worm 61 and the worm wheel 62.

As illustrated in FIG. 5, the carrier 64 includes a support target portion 64a having a cylindrical shape to be supported by the support shaft 52b. By fitting the support target portion 64a into the support shaft 52b, the carrier 64 is rotatably supported by the support shaft 52b. The first output gear 53 is rotatably supported by the outer circumferential surface of the support target portion 64a of the carrier 64.

As illustrated in FIG. 6A, three engaging projections 64b of the carrier 64 are disposed facing the first output gear 53 in the carrier 64, at equal intervals in the rotational direction. By contrast, three engaging target projections 53a of the first output gear 53 are disposed facing the carrier 64 in the first output gear 53, at equal intervals in the rotational direction. Consequently, as illustrated in FIG. 6A, the engaging projections 64b of the carrier 64 are fitted into respective spaces between the engaging target projections 53a of the first output gear 53. By so doing, the carrier 64 and the first output gear 53 are engaged with each other.

In the planetary gear mechanism 70 according to the present embodiment, the sun gear 62b functions as an input portion (a driving portion), the internal gear 66a functions as a fixed portion, and the carrier 64 functions as an output portion (a driven portion). By setting the sun gear 62b as the input portion, the internal gear 66a as the fixed portion, and the carrier 64 as the output portion, the planetary gear mechanism 70 according to the present embodiment can obtain a greatest reduction ratio.

The second output gear 54 that meshes with the first output gear 53 is rotatably supported by the first housing 66 and the second housing 56. The second housing 56 is combined with the first housing 66 so as to cover the first output gear 53 and the second output gear 54.

As the drive motor 51 rotates, the worm gear 60 reduces the speed of rotation before the sun gear 62b of the planetary gear mechanism 70 rotates. As the sun gear 62b rotates, the planetary gears 65 that mesh with the sun gear 62b revolve around the sun gear 62b while rotating. Due to revolution of the planetary gears 65 around the sun gear 62b, the carrier 64 is rotates, and the first output gear 53 that is engaged with the carrier 64 is rotated together with the carrier 64. Then, the driving force is transmitted to the second output gear 54 that is meshed with the first output gear 53, and the pair of cams 44 is rotated via the cam gear 55, as illustrated in FIG. 2.

In the present embodiment, the reduction ratio of the worm gear 60 is set to 30 and the reduction ratio of the planetary gear mechanism 70 is set to 4. Therefore, the reduction ratio of the worm gear 60 and the planetary gear mechanism 70 is set to 120. Consequently, the output torque to be output to the pair of cams 44 can be 120 times as large as the drive torque of the drive motor 51. Thus, a high reduction ratio can be obtained as described above, even when the drive motor 51 having a relatively small drive torque is used, the output torque to the pair of cams 44 can be made greater than the load torque of the pair of cams 44. Accordingly, even when the drive motor 51 is a less expensive and compact brush motor having a relatively small torque, the drive motor 51 can rotate the pair of cams 44 preferably, and the pressing force of the pressure roller 19 to the fixing roller 18 can be adjusted reliably. Accordingly, even when the drive motor to drive the pair of cams 44 different from the drive motor to drive the fixing roller 18 is used, an increase in size of the image forming apparatus 100 can be restrained, and an increase in cost of the image forming apparatus 100 can further be restrained.

By using the drive motor to drive the pair of cams 44 different from the drive motor to drive the fixing roller 18, when the image forming apparatus 100 is recovered from the sleep mode, for example, an increase in the pressing force of the pressure roller 19 and an operation to rotate the fixing roller 18 and increase the temperature of the fixing roller 18 to a predetermined temperature can be performed at the same time. Consequently, a reduction in a start up time of the image forming apparatus 100 can be enhanced easily.

Further, the drive device 50 includes the worm gear 60 and the planetary gear mechanism 70. According to this configuration, a relatively large reduction ratio can be obtained. Therefore, when compared with a configuration in which a gear train is employed to obtain a large reduction ratio, an increase in size of the image forming apparatus 100 can be restrained.

Further, in the present embodiment, the planetary gear mechanism 70 is provided in the worm wheel 62. According to this configuration, an increase in size of the drive device 50 in the axial direction can be restrained, and therefore an increase in size of the image forming apparatus 100 in the axial direction can be restrained. Further, the worm gear 60 is employed in the present embodiment. According to this configuration, the drive motor 51 can be located such that the rotational axis of the drive motor 51 becomes perpendicular to the rotational axis of the cam shaft 44a. Accordingly, when compared with a configuration in which the drive motor 51 is located such that the rotational axis of the drive motor 51 becomes parallel to the rotational axis of the cam shaft 44a, the increase in size of the image forming apparatus 100 in the axial direction can be restrained.

Further, in the present embodiment, a high reduction ratio can be obtained, and therefore the angle of rotation of the pair of cams 44 to the amount of driving force of the drive motor 51 can be relatively small. Accordingly, the angle of rotation of the pair of cams 44 can be adjusted finely, and therefore fine adjustment of the pressing force can be performed.

Further, a high reduction ratio can be obtained by using the worm gear 60 and the planetary gear mechanism 70. According to this configuration, the following effects can be achieved. When a top dead center of the pair of cams 44 contacts the cam bearing 42, a distance from the center of the cam shaft 44a of the pair of cams 44 to the outer circumferential surface of the pair of cams 44 becomes the greatest distance. When the pair of cams 44 are rotated from this state, the biasing force of the pair of springs 43 works to the pair of cams 44 in the rotational direction of the pair of cams 44. As a result, the pair of cams 44 is pressed in the rotational direction by the biasing force of the pair of springs 43 to cause the pair of cams 44 to rotate. However, since the configuration of the present embodiment can obtain a high reduction ratio, a large amount of force is to be applied to rotate the pair of cams 44 on the side of the pair of cams 44. As a result, even when the pair of cams 44 is pressed to the rotational direction by the biasing force of the pair of springs 43, the speed of rotation of the pair of cams 44 does not increase instantly. Accordingly, the pair of cams 44 and the cam bearings 42 do not separate instantly, and therefore no sound of impact occurs when the pair of cams 44 and the cam bearings 42 contact with each other again.

Further, in the present embodiment, the units and components of the worm gear 60 and the planetary gear mechanism 70, specifically, the worm 61, the worm wheel 62, the planetary gears 65, the carrier 64, the first housing 66, and the second housing 56, are formed by resin having high sliding performance, such as polyacetal (POM). By contrast, the first output gear 53 and the second output gear 54 are formed by resin reinforced by including glass fibers and carbon. Since the speed of rotation is not reduced from the first output gear 53 to the second output gear 54, large load torques are applied to the first output gear 53 and the second output gear 54. In order not to break or damage the first output gear 53 and the second output gear 54 due to the load torques, the resin used for forming the first output gear 53 and the second output gear 54 includes glass fibers and carbon.

However, as a result of increase in stiffness of resin including glass fibers and carbon, the sliding performance deteriorates. Therefore, in a case in which the first output gear 53 is rotatably supported directly to the support shaft 52b that includes metal, a contact face of the first output gear 53 with the support shaft 52b wears quickly. Due to this reason, in the present embodiment, as illustrated in FIG. 5, the first output gear 53 is rotatably supported by the support target portion 64a of the carrier 64 that rotates together with the first output gear 53 as a single unit. Accordingly, wear of the first output gear 53 can be restrained.

Further, the first housing 66 and the second housing 56 that rotatably support the second output gear 54 are formed by sliding grade resin. By so doing, the contact face of the second output gear 54 with the second housing 56 and the contact face of the second output gear 54 with the first housing 66 can be restrained or prevented from being worn.

Further, in the present embodiment, the units and components of the worm gear 60 and the planetary gear mechanism 70 are formed by sliding grade resin. By so doing, these units and components can be restrained or prevented from being worn or from making meshing noise.

Further, due to meshing of the worm 61 and the helical teeth portion 62a of the worm wheel 62, a force is generated to the worm 61 in a thrust direction. Depending on the configuration of a device, a twisting direction of teeth of the worm 61 is likely to correspond to a direction in which a force is generated to the worm 61 in a thrust direction away from the motor shaft 51a. However, in the present example of this disclosure, the bracket 52 has an opposed face 52a that extends in a direction perpendicular to the rotational axis of the drive motor 51 and that is disposed facing the worm 61. Consequently, when the force is applied to the worm 61 in the thrust direction to be detached from the motor shaft 51a and the worm 61 is about to move in this thrust direction away from the motor shaft 51a, the worm 61 that functions as a stopper abuts against the opposed face 52a. Accordingly, the configuration of the present embodiment can prevent the worm 61 from being detached from the motor shaft 51a.

Figure 7:
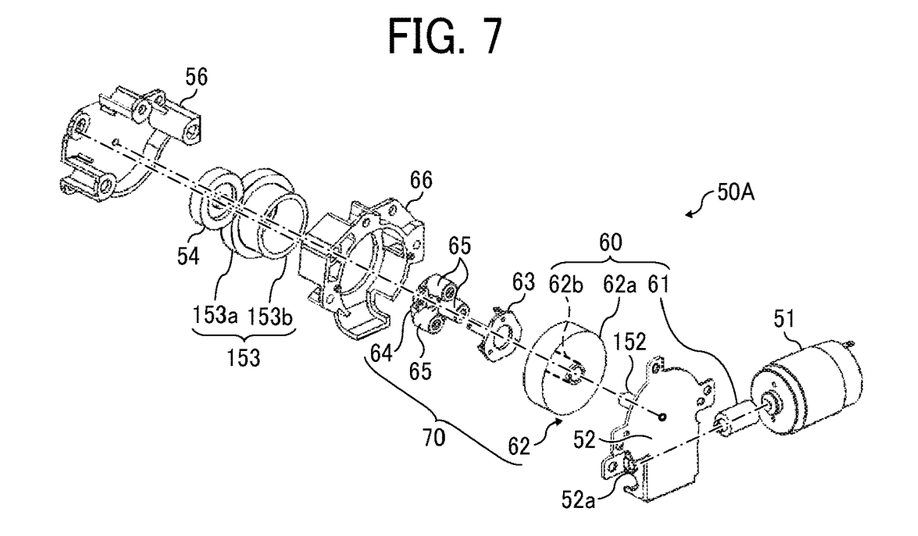
FIG. 7 is an exploded perspective view illustrating a drive device according to a variation of this disclosure.

Next, a description is given of a drive device 50A according to a variation of the present embodiment of this disclosure. Hereinafter, the variation is referred to as "Variation".

Figure 8:
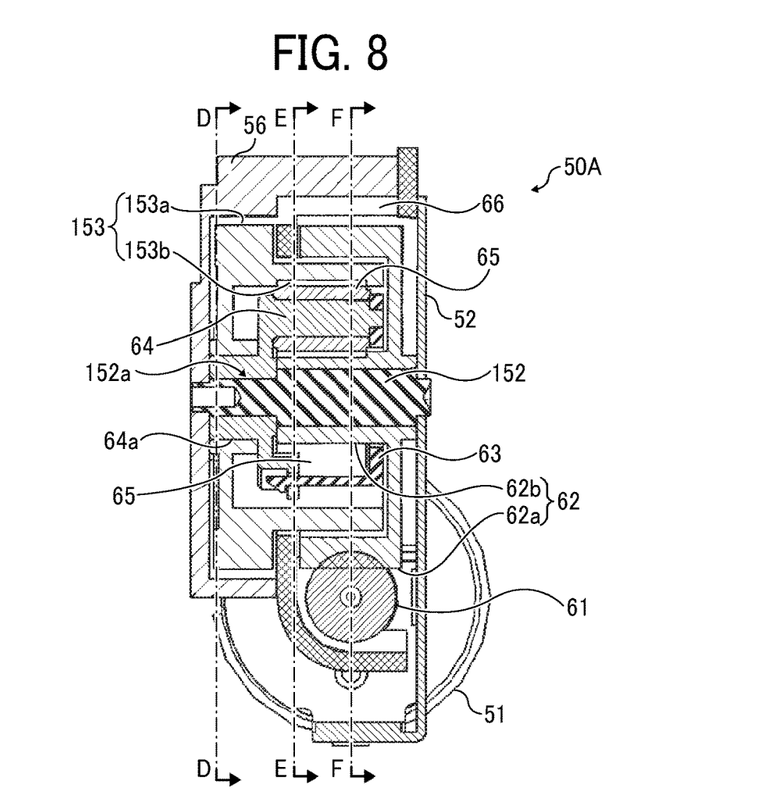
FIG. 8 is a cross sectional view illustrating the drive device of FIG. 7, viewed parallel to an axial direction.
Figure 9A:
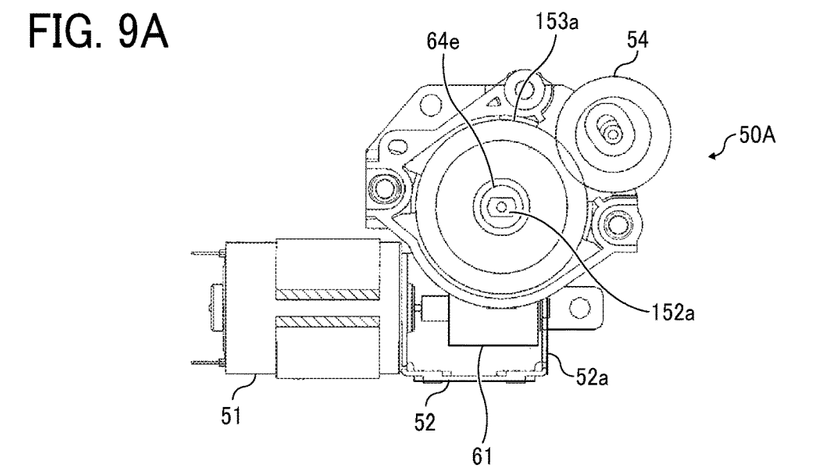
FIG. 9A is a cross sectional view of the drive device of FIG. 8, along a line D-D.
Figure 9B:
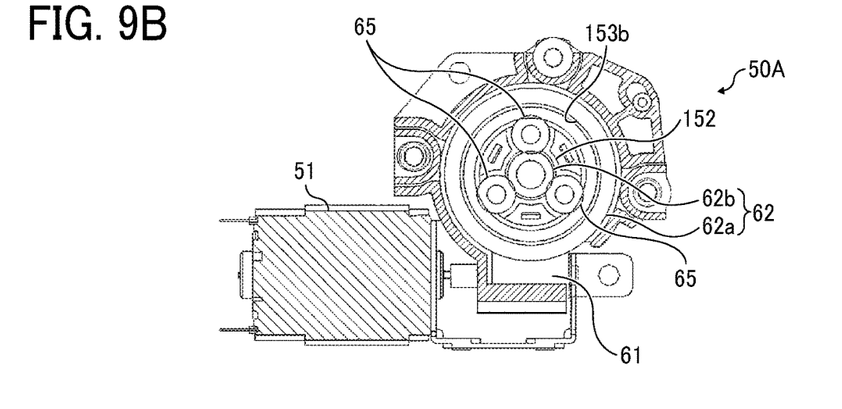
FIG. 9B is a cross sectional view of the drive device of FIG. 8, along a line E-E.
Figure 9C:
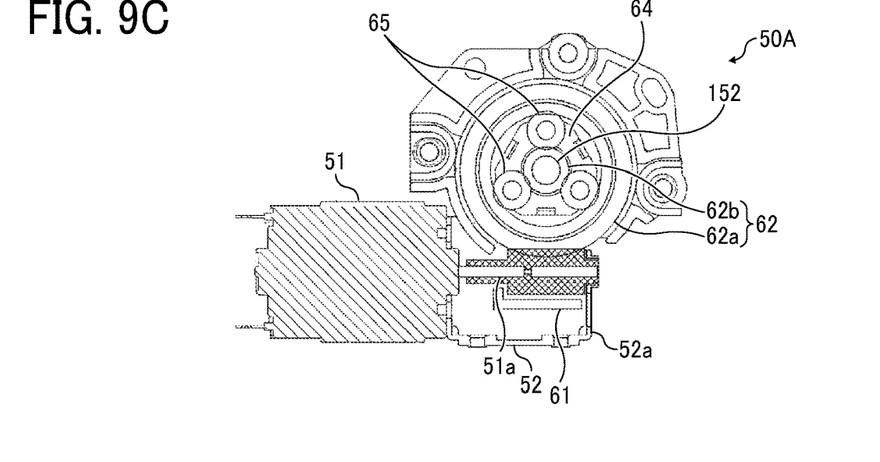
FIG. 9C is a cross sectional view of the drive device of FIG. 8, along a line F-F.

FIG. 7 is an exploded perspective view illustrating the drive device 50A according to Variation of this disclosure. FIG. 8 is a cross sectional view illustrating the drive device 50A, viewed parallel to the axial direction. FIG. 9A is a cross sectional view of the drive device 50A of FIG. 8, along a line D-D. FIG. 9B is a cross sectional view of the drive device 50A of FIG. 8, along a line E-E. FIG. 9C is a cross sectional view of the drive device 50A of FIG. 8, along a line F-F.

In the drive device 50A of Variation, the carrier 64 of the planetary gear mechanism 70 functions as a fixed portion and an internal gear 153b functions as an internal gear 66a functions as an output portion. As illustrated in FIGS. 8, 9A, 9B, and 9C, the drive device 50A of Variation includes a support shaft 152 and a carrier support 152a. The carrier support 152a has a rectangle shape with rounded corners and is disposed at leading end side of the support shaft 152. In addition, the support target portion 64a of the carrier 64 of the drive device 50A has a rectangle shape with rounded corners that is similar in shape of the carrier support 152a of the support shaft 152. According to this configuration, by inserting the carrier support 152a of the support shaft 152 into the support target portion 64a of the carrier 64, the carrier 64 is fixedly (unrotatably) supported by the support shaft 152.

Further, the drive device 50A of Variation further includes a first output unit 153 including an internal gear 153b and a first output gear 153a as a single unit. The first output unit 153 is rotatably supported by the outer circumferential surface of the support target portion 64a of the carrier 64. Since a large load torque is applied to the first output gear 153a, the first output unit 153 includes resin that has increased in stiffness by including glass fibers and carbon, similarly to the above-described embodiment. By contrast, similarly to the above-described embodiment, the carrier includes sliding grade resin. Accordingly, with the first output unit 153 being rotatably supported by the outer circumferential surface of the support target portion 64a of the carrier 64, when compared with a configuration in which the first output unit 153 is supported by the support shaft 152 that is made of metal, the sliding resistance can be reduced and wear of the first output unit 153 can be restrained.

In Variation, when the driving force applied by the drive motor 51 is transmitted via the worm gear 60 and the sun gear 62b rotates, the planetary gears 65 that are meshed with the sun gear 62b rotate, and therefore the internal gear 153b and the first output gear 153a rotate together as a single unit. Then, the driving force is transmitted to the second output gear 54 that is meshed with the first output gear 153a, and the pair of cams 44 is rotated via the cam gear 55, as illustrated in FIG. 2. The sun gear 62b and the internal gear 153b are mounted coaxially.

Thus, similar to the above-described embodiment, a high reduction ratio can be obtained in Variation, and therefore the drive motor 51 can be a compact, inexpensive motor having a relatively small drive torque. Further, while the direction of rotation of the sun gear 62b is same as the direction of rotation of the first output gear 53 in the drive device 50 according to the embodiment illustrated in FIGS. 4, 5, 6A, 6B, and 6C, the direction of rotation of the sun gear 62b is different from the direction of rotation of the first output gear 153a of the first output unit 153 in Variation. Accordingly, the direction of rotation of the pair of cams 44 in Variation can be different from the direction of rotation of the pair of cams 44 illustrated in the embodiment of FIGS. 4 through 6C.

Accordingly, depending on the configuration of the device, the direction of rotation of the pair of cams 44 may be different from the embodiment of FIGS. 4 through 6C. By differing the direction of rotation of the drive motor from the embodiment of FIGS. 4 through 6C, the configuration of the pressure adjustment mechanism can be employed to an image forming apparatus having a different configuration in which the direction of rotation of the pair of cams 44 is different from the embodiment of FIGS. 4 through 6C.

However, in this case, it is likely that the force is applied to the worm in the thrust direction to detach the worm from the motor shaft 51a. Therefore, another idler gear is added to the drive transmission passage from the first output gear to the cam gear. By so doing, without changing the direction of rotation of the drive motor to be different from the embodiment of FIGS. 4 through 6C, the configuration of the pressure adjustment mechanism can be employed to an image forming apparatus having a configuration in which the direction of rotation of the pair of cams 44 is different from the embodiment of FIGS. 4 through 6C.

In this case, the size of the drive device increases when compared with the configuration of the drive device 50 of the embodiment of FIGS. 4 through 6C. In order to address this inconvenience, similar to the configuration of Variation, the internal gear of the planetary gear functions as an output portion and the carrier functions as the fixed portion. According to this configuration, without increasing the size of the drive device and changing the direction of rotation of the drive motor to be different from the embodiment of FIGS. 4 through 6C, the configuration of the pressure adjustment mechanism can be employed to an image forming apparatus having a configuration in which the direction of rotation of the pair of cams 44 is different from the embodiment of FIGS. 4 through 6C.

The configurations according to the above-descried embodiments are not limited thereto. This disclosure can achieve the following aspects effectively.

Aspect 1.

In Aspect 1, a fixing device (for example, the fixing device 12) includes a heater (for example, the infrared heater 23), a heating target body (for example, the fixing roller 18), a biasing body (for example, the pair of springs 43), a pressure body (for example, the pressure roller 19), a moving body (for example, the pair of cams 44), a drive source (for example, the drive motor 51), and a drive transmitter (for example, the drive device 50). The heating target body is configured to be heated by the heater. The biasing body is configured to apply a biasing force. The pressure body is configured to be pressed by the biasing body toward the heating target body. The moving body is configured to move the pressure body away from the heating target body against the biasing force applied by the biasing body. The drive source has a driving force output shaft (for example, the motor shaft 51a) and is configured to apply a driving force. The drive transmitter is configured to transmit the driving force of the drive source to the moving body and includes a planetary gear device (for example, the planetary gear mechanism 70) and a worm gear (for example, the worm gear 60).

According to Aspect 1, the drive transmitter includes the planetary gear device and the worm gear. Therefore, a relatively large reduction ratio can be obtained, and an output torque to be outputted to the moving body can be enhanced significantly. Consequently, even when the drive source has a relatively small torque, an output torque to be output to the moving body is greater than a load torque that is applied to the moving body when the pressure body is moved to a direction to be separated from the heating target body against the biasing force of the biasing body. Accordingly, a compact and less expensive drive source having a relatively small torque can be used to the fixing device and an image forming apparatus incorporating the fixing device, and therefore an increase in size and cost of the fixing device and the image forming apparatus.

Aspect 2.

In Aspect 1, the worm gear (for example, the worm gear 60) includes a worm (for example, the worm 61) and a worm wheel (for example, the worm wheel 62). The worm is coaxially mounted on the driving force output shaft (for example, the motor shaft 51a) of the drive source (for example, the drive motor 51). The worm wheel is configured to mesh with the worm. The planetary gear device (for example, the planetary gear mechanism 70) is disposed inside the worm wheel.

According to this configuration, as described in the above-described embodiment, the size of the drive transmitter can be reduced in the axial direction. Further, the drive source can be located such that the driving force output shaft of the drive source becomes perpendicular to the rotational axis of the worm wheel. Therefore, when compared with a configuration in which the driving force output shaft of the drive source is disposed parallel to the rotational axis of the worm wheel, the size of the fixing device and an image forming apparatus incorporating the fixing device can be reduced in the axial direction.

Aspect 3.

In Aspect 2, the planetary gear mechanism (for example, the planetary gear mechanism 70) includes a sun gear (for example, the sun gear 62b), an internal gear (for example, the internal gear 66a), a planetary gear (for example, the planetary gears 65), and a carrier (for example, the carrier 64). The internal gear is coaxially mounted with the sun gear. The planetary gear is configured to mesh with the sun gear and the internal gear. The carrier is configured to rotatably support the planetary gear. The driving force is inputted from the worm wheel to the sun gear and is outputted from the carrier.

According to this configuration, as described in the above-described embodiment above, a relatively large reduction ratio can be obtained.

Aspect 4.

In Aspect 3, the drive transmitter (for example, the drive device 50) further includes a drive transmission body (for example, the first output gear 53) to which the driving force is transmitted from the planetary gear device (for example, the planetary gear mechanism 70). The carrier (for example, the carrier 64) includes an engaging body (for example, the engaging projections 64b) configured to engage with the drive transmission body.

According to this configuration, as described in the embodiment above, the drive transmission body can be rotated with the carrier as a single unit, and therefore the driving force can be output from the carrier to the drive transmission body via the engaging body.

Aspect 5.

In Aspect 2, the planetary gear device (for example, the planetary gear mechanism 70) includes a sun gear (for example, the sun gear 62b), an internal gear (for example, the internal gear 153b), a planetary gear (for example, the planetary gears 65), and a carrier (for example, the carrier 64). The internal gear is coaxially mounted with the sun gear. The planetary gear is configured to mesh with the sun gear and the internal gear. The carrier is configured to rotatably support the planetary gear. The driving force is inputted from the worm wheel to the sun gear and is outputted from the internal gear.

According to this configuration, as described in Variation above, the direction of rotation of the drive output body (for example, the worm wheel 62) to which the driving force is inputted to the planetary gear mechanism is different from the direction of rotation of the drive output body (for example, the first output gear 153a) to which the driving force is output from the planetary gear device.

Aspect 6.

In any one of Aspect 3 through Aspect 5, the drive output body (for example, the first output gear) to which the driving force is output from the planetary gear device (for example, the planetary gear mechanism 70) is supported by the carrier (for example, the carrier 64) of the planetary gear device.

According to this configuration, as described in the above-described embodiment ad Variation, wear of the drive output body can be restrained or prevented.

Aspect 7.

In any one of Aspect 1 through Aspect 6, the worm gear (for example, the worm gear 60) includes a worm (for example, the worm 61) coaxially mounted on the driving force output shaft (for example, the motor shaft 51a). The drive transmitter (for example, the drive device 50) further includes a bracket (for example, the bracket 52) having a stopper (for example, the opposed face 52a) disposed facing the worm of the worm gear. The stopper is configured to prevent the worm from being detached from the driving force output shaft.

According to this configuration, as described in the embodiment above, even if the thrust force is generated to the worm in a direction to be detached from the driving force output shaft, the worm is not detached from the driving force output shaft.

Aspect 8.

An image forming apparatus (for example, the image forming apparatus 100) includes a toner image forming device (for example, the process cartridge 1), a transfer device (for example, the transfer device 10), and a fixing device (for example, the fixing device 12). The toner image forming device includes including an image bearer (for example, the photoconductor 2) is configured to form a toner image on the surface of the image bearer that is configured to bear an image on a surface thereof. The transfer device is configured to transfer the image from the image bearer onto a recording medium (for example, the sheet P). The fixing device is the fixing device according to any one of Aspect 1 through Aspect 7, configured to fix the toner image transferred onto the recording medium to the recording medium.

According to this configuration, an increase in size and cost of the image forming apparatus can be restrained.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. A fixing device comprising:
a heater;
a heating target body configured to be heated by the heater;
a biasing body configured to apply a biasing force;
a pressure body configured to be pressed by the biasing body toward the heating target body;
a moving body configured to move the pressure body away from the heating target body against the biasing force applied by the biasing body;
a drive source including a driving force output shaft, the drive source being configured to apply a driving force;
a drive transmitter configured to transmit the driving force of the drive source to the moving body, the drive transmitter including a planetary gear device and a worm gear, the worm gear including,
a worm coaxially mounted on the driving force output shaft; and
a worm wheel configured to mesh with the worm, the planetary gear device being inside the worm wheel;
a sun gear;
an internal gear coaxially mounted with the sun gear;
a planetary gear configured to mesh with the sun gear and the internal gear; and
a carrier configured to rotatably support the planetary gear,
wherein the driving force is inputted from the worm wheel to the sun gear and is outputted from the carrier.

2. The fixing device according to claim 1,
wherein the planetary gear includes multiple planetary gears.

3. The fixing device according to claim 1,
wherein the drive transmitter further includes a drive output body to which the driving force is transmitted from the planetary gear device; and
wherein the carrier includes an engaging body configured to engage with the drive output body.

4. The fixing device according to claim 3,
wherein the engaging body includes multiple engaging bodies.

5. The fixing device according to claim 1,
wherein the drive transmitter further includes a drive output body to which the driving force is transmitted from the planetary gear device; and
wherein the drive output body is supported by the carrier of the planetary gear device.

6. An image forming apparatus comprising:
a toner image forming device including an image bearer configured to bear an image on a surface thereof, the toner image forming device configured to form a toner image on the surface of the image bearer;
a transfer device configured to transfer the image from the image bearer onto a recording medium; and
the fixing device according to claim 1, configured to fixed the toner image transferred onto the recording medium to the recording medium.

7. The fixing device according to claim 1, wherein the planetary gear device and the worm gear are formed of slidable resin.

8. A fixing device comprising:
a heater;
a heating target body configured to be heated by the heater;
a biasing body configured to apply a biasing force;
a pressure body configured to be pressed by the biasing body toward the heating target body;
a moving body configured to move the pressure body away from the heating target body against the biasing force applied by the biasing body;
a drive source including a driving force output shaft, the drive source being configured to apply a driving force; and
a drive transmitter configured to transmit the driving force of the drive source to the moving body, the drive transmitter including a planetary gear device and a worm gear, the worm gear including,
a worm coaxially mounted on the driving force output shaft; and
a worm wheel configured to mesh with the worm, the planetary gear device being inside the worm wheel, the planetary gear device including,
a sun gear,
an internal gear coaxially mounted with the sun gear,
a planetary gear configured to mesh with the sun gear and the internal gear, and
a carrier configured to rotatably support the planetary gear,
wherein the driving force is inputted from the worm wheel to the sun gear and is outputted from the internal gear.

9. The fixing device according to claim 8, wherein the planetary gear device and the worm gear are formed of slidable resin.

10. A fixing device comprising:
a healer;
a heating target body configured to be heated by the heater;
a biasing body configured to apply a biasing force;
a pressure body configured to be pressed by the biasing body toward the heating target body;
a moving body configured to move the pressure body away from the heating target body against the biasing force applied by the biasing body;
a drive source including a driving force output shaft, the drive source being configured to apply a driving force; and
a drive transmitter configured to transmit the driving force of the drive source to the moving body, the drive transmitter including a planetary gear device, a worm gear, and a bracket, the worm gear including,
a worm coaxially mounted on the driving force output shaft, the bracket having a stopper facing the worm of the worm gear, the stopper configured to prevent the worm from being detached from the driving force output shaft.

11. The fixing device according to claim 10, wherein the planetary gear device and the worm gear are formed of slidable resin.

* * * * *